June 20, 1939.  G. T. MARKEY  2,163,363
INCUBATOR-HATCHER
Filed Jan. 16, 1935    5 Sheets—Sheet 1
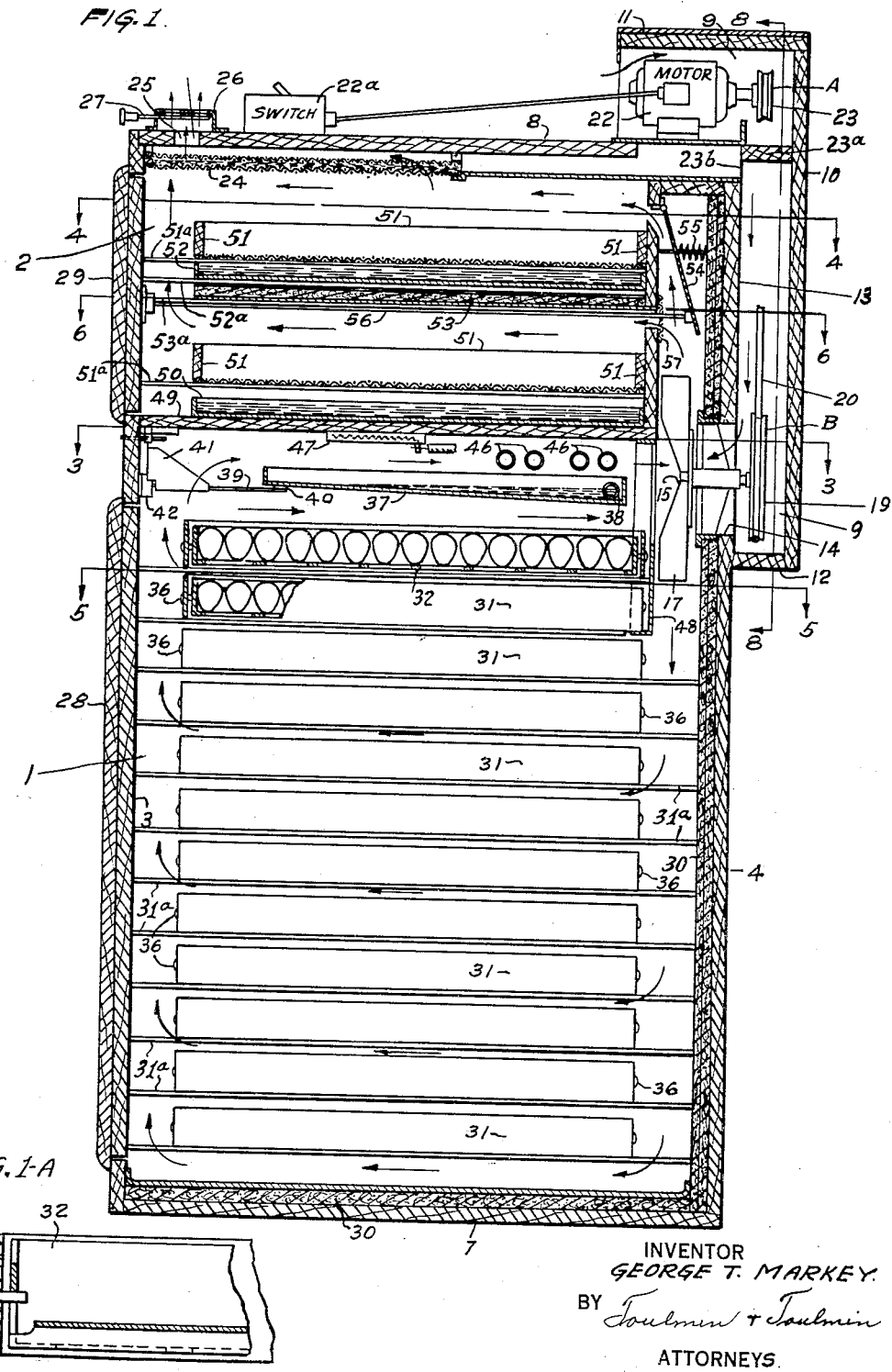
INVENTOR
GEORGE T. MARKEY.
BY Toulmin & Toulmin
ATTORNEYS.

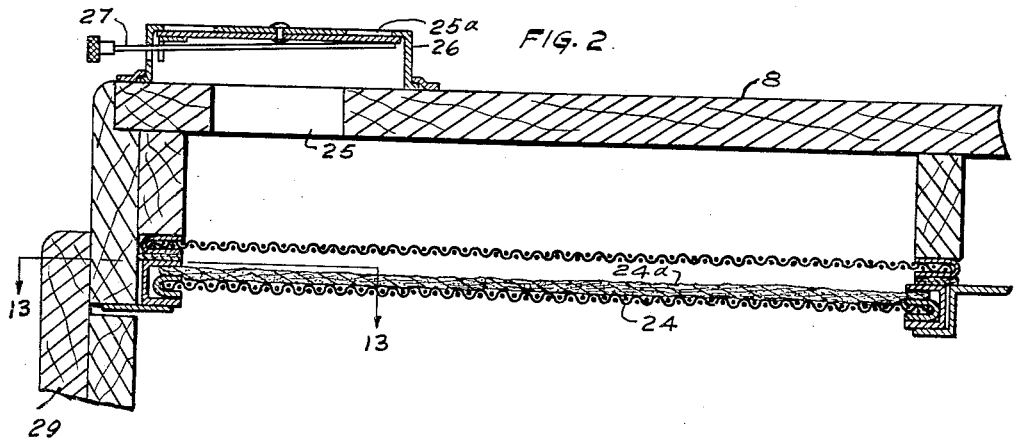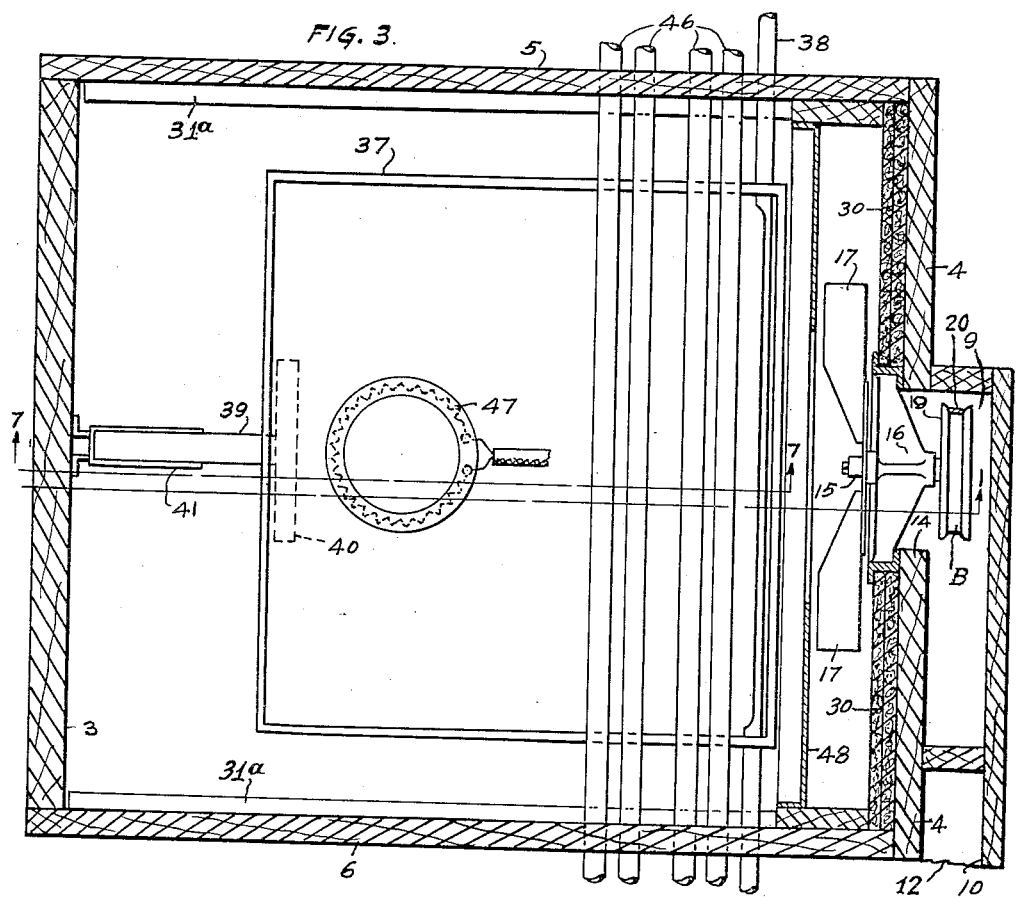

June 20, 1939.　　　G. T. MARKEY　　　2,163,363
INCUBATOR-HATCHER
Filed Jan. 16, 1935　　　5 Sheets-Sheet 3
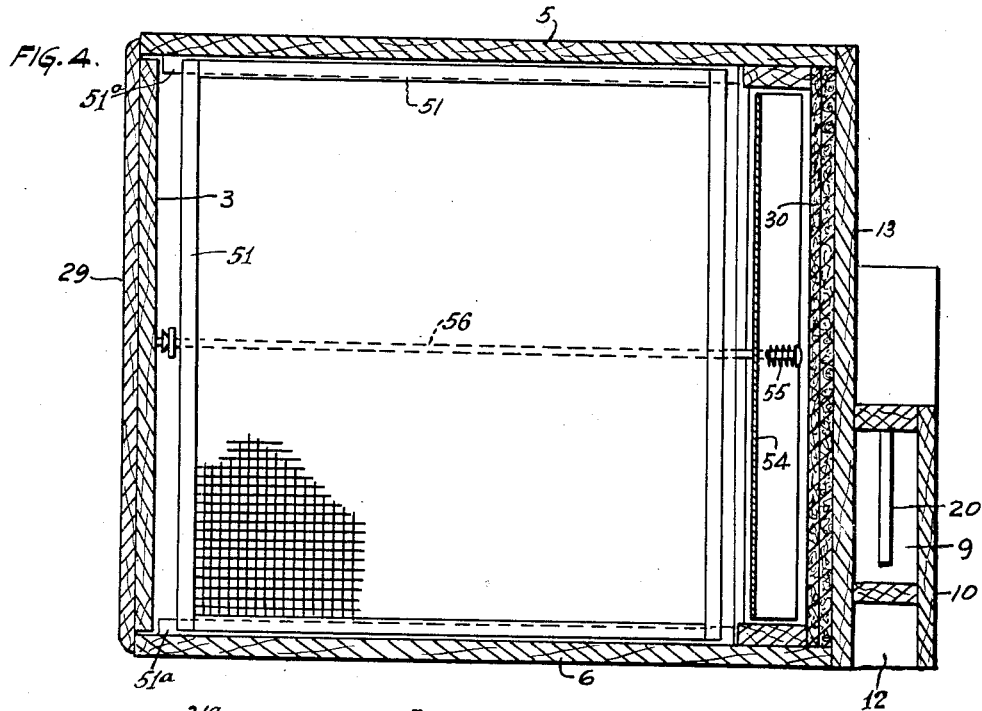
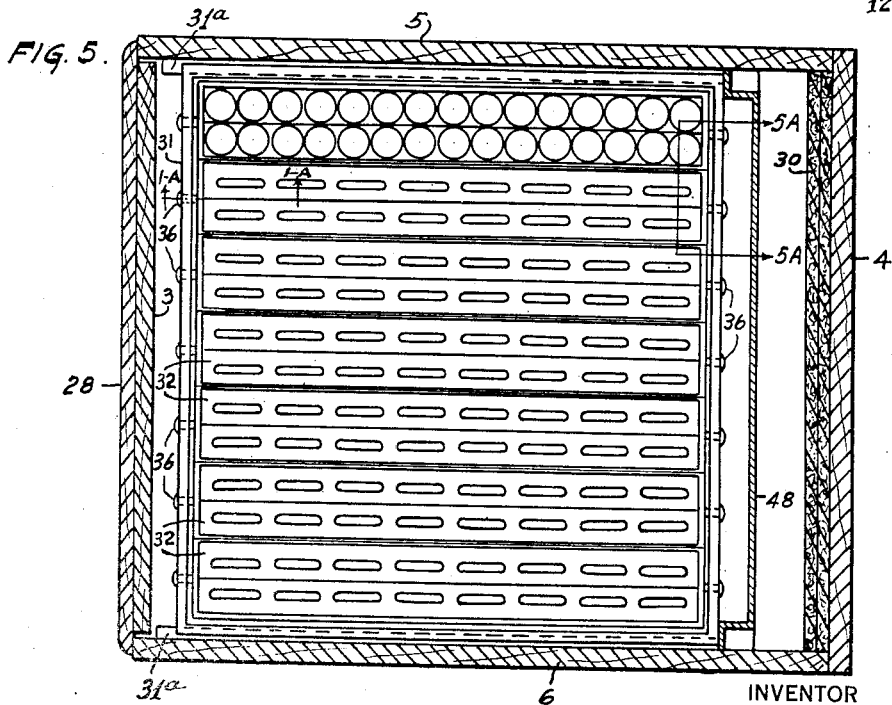
INVENTOR
GEORGE T. MARKEY.
BY Toulmin & Toulmin
ATTORNEYS.

June 20, 1939.    G. T. MARKEY    2,163,363
INCUBATOR-HATCHER
Filed Jan. 16, 1935    5 Sheets-Sheet 4
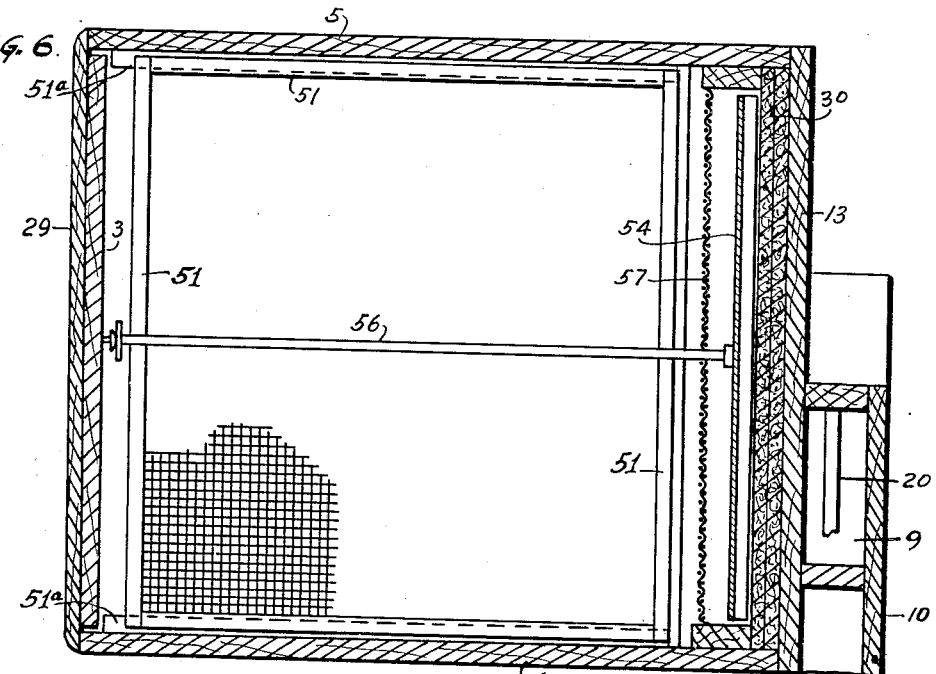
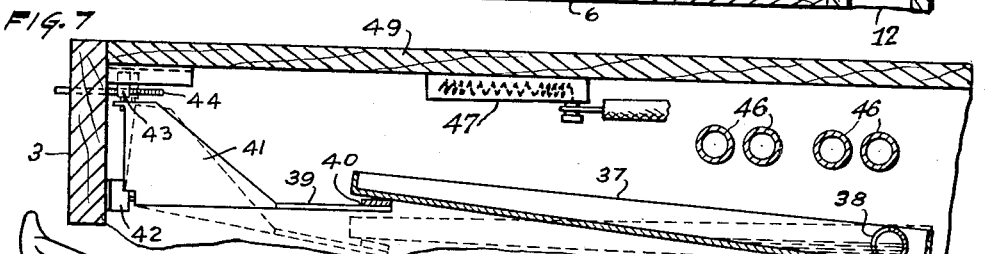
INVENTOR
GEORGE T. MARKEY.
BY Toulmin & Toulmin
ATTORNEYS

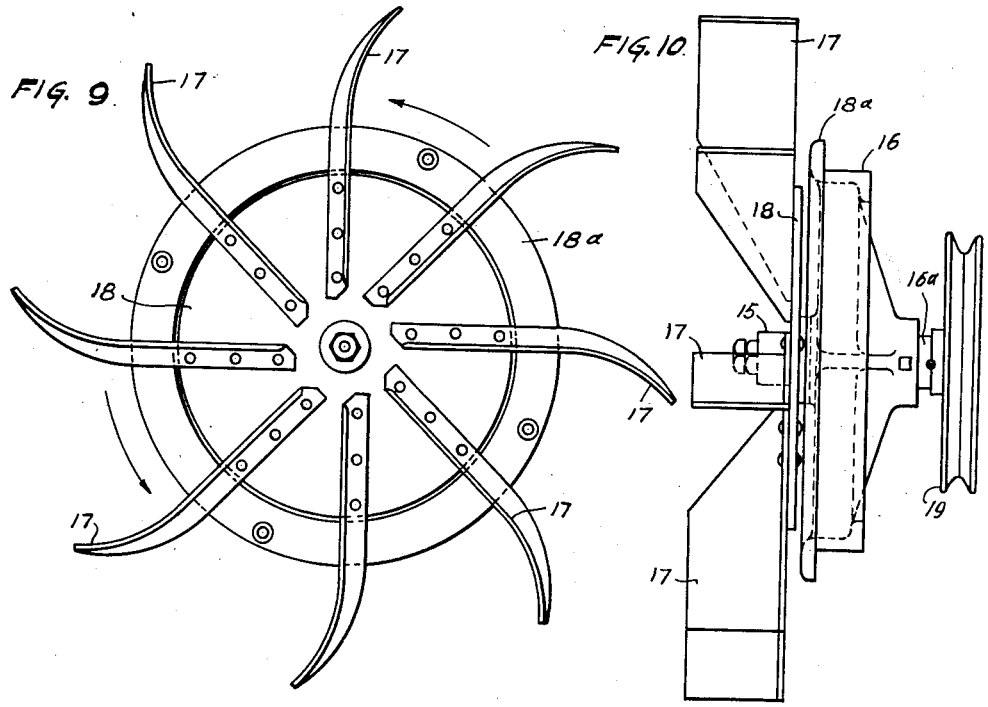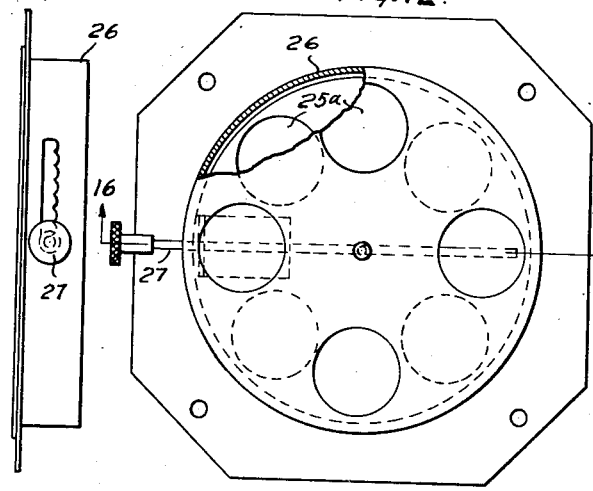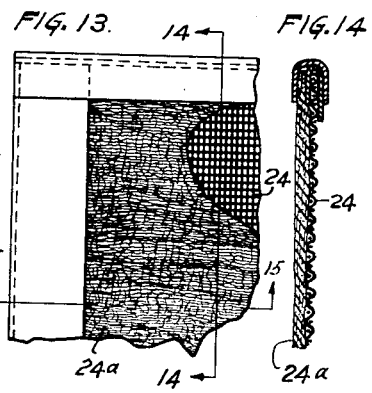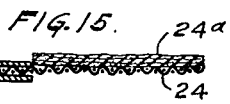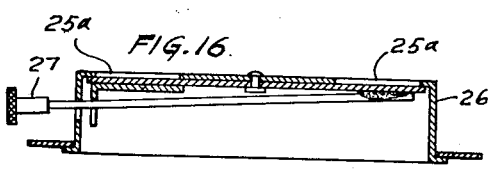

Patented June 20, 1939

2,163,363

UNITED STATES PATENT OFFICE 2,163,363

INCUBATOR-HATCHER

George T. Markey, Fort Atkinson, Wis., assignor to James Manufacturing Company, Fort Atkinson, Wis., a corporation of Wisconsin Application January 16, 1935, Serial No. 2,069

12 Claims. (Cl. 119—35)

This invention relates to incubators for incubating eggs and hatching the chicks developed in the eggs; and has for its several objects the features of organization and construction hereinafter pointed out.

Referring to the major features of organization, I would state that they consist of a general cabinet constituting two compartments, an incubating compartment and a hatching compartment to be spoken of as the hatcher; with an interior space extending into both compartments and interconnecting them, and of an air agitator, preferably in the nature of a slow-rotating instrumentality, which operates to slowly circulate and agitate the air through the two compartments and allow the air so circulated through the incubating compartment to circulate upward through the hatching compartment but prevent the entry of air from the hatching compartment to the incubating compartment, which might spread disease germs and infect the incubating eggs. The location and action of this slow-moving air agitator is preferably such that it acts on the air in two general bodies—one through such interior space and amongst the eggs in the incubating chamber to carry heat and moisture to them, and the other through the interior space and over the eggs in the hatcher, whereby the heat and moisture are circulated and agitated in the hatcher and about the eggs.

A further organization arrangement comprises the incubating chamber and the hatching chamber respectively within the incubator housing and the hatcher housing, with an air agitator which acts to agitate the air in the two compartments, the air in the incubating compartment passing thence into the hatcher compartment, the latter having an exhaust opening serving both compartments; and the general housing having an air inlet which serves air to the agitator for both compartments.

Further organization features comprise a hatcher compartment with a plurality of egg trays therein, and a moisture-supplying pan associated with the trays so that the air in the hatcher will have an increased moisture content to counteract the high temperature condition natural to the eggs in their advanced or hatching condition.

And this invention embraces further a structural feature which relates to the hatcher comprising a bed of insulating material located below the upper hatching trays, and an adjustable damper to control the entrance of the air over the hatching eggs, as the air in the air-space reaches the hatching trays.

A further structural feature in the hatcher comprises a foraminous wall near the ceiling of the hatcher chamber, overlapping the air exit opening and adapted to filter out all germ-carrying particles and impede or moderate the exit of the air, so that any tendency of the air to exhaust too rapidly from any portion of the compartment through the exit will be checked.

A further structural feature comprises a water pan and a heater associated with it, the pan being adjustable at one end to vary the surface area of the water for the purpose of controlling the humidity within the compartment.

By reason of the aforesaid organization and structural features this incubator-hatcher has been found in actual use to be efficient in the operation of incubating eggs and hatching chickens; and to be easy for the hatcheryman to operate economically, and with such regularity of performance that a satisfactory percent of hatched chicks results from the operation of this apparatus.

Referring to the drawings:

Figure 1 is a vertical sectional view of my incubator, the section being taken on the line 1—1 of Fig. 3, the agitator and its parts being left unsectioned.

Figure 1A is a partial vertical sectional view on the line 1A—1A of Fig. 5 through a portion of one of the trays and one of the racks showing how the racks are pivotally mounted in the trays, a part of said racks and trays being broken away.

Figure 2 is an enlarged fragmentary vertical sectional view of the upper part of the hatcher compartment, as shown in Fig. 1, showing the air exhaust opening and a form of the exhaust-moderating and filtering features.

Figure 3 is a horizontal sectional view on the line 3—3 of Fig. 1.

Figure 4 is another horizontal sectional view taken on the line 4—4 of Fig. 1.

Figure 5 is a further horizontal sectional view taken on the line 5—5 of Fig. 1.

Figure 5A is a sectional view on the line 5A—5A of Fig. 5 looking in the direction of the arrows, showing how the egg cages or racks are mounted in the egg trays and adapted to be tipped from side to side.

Figure 5B is a plan view of the devices shown in Figure 5A.

Figure 6 is still another horizontal section taken on the line 6—6 of Fig. 1.

Figure 7 is a vertical sectional view taken on the line 7—7 of Fig. 3 showing the water pan and its adjusting devices, including a key.

Figure 8 is a vertical sectional view taken on the line 8—8 of Fig. 1.

Figure 9 is a front elevation of the agitator.

Figure 10 is a side elevation thereof.

Figure 11 is a side view of the damper for controlling the air outlet port above the hatcher.

Figure 12 is a plan view partly broken away, of said damper.

Figure 13 is a horizontal sectional view taken on the line 13—13 of Fig. 2.

Figure 14 is a sectional view taken on the line 14—14 of Figure 13.

Figure 15 is a sectional view taken on the line 15—15 of Fig. 13.

Figure 16 is a detail vertical sectional view, on the line 16—16 of Fig. 12, of the damper which controls the outlet opening in the hatcher compartment.

Referring to the drawings in detail, the numeral 1 indicates the incubator-chamber and the numeral 2 the hatcher, or hatching chamber. These chambers are within a general housing in the nature of front and back walls 3 and 4 (Fig. 1) and side walls 5 and 6 (Figure 3). A bottom 7 and a top wall 8 complete the enclosing structure with the exception of the air inlet passage 9 with its enclosing vertical wall 10 and the horizontal walls 11 and 12. An inner wall 13 closes the inner end of the hatcher chamber 2 and forms part of the enclosure of the air inlet passage 9.

It will be noted that between the wall 4 and the wall 13 there is an opening 14 which allows the incoming fresh air to pass into the two chambers, the incubating and the hatching. The air agitator 15 has its shaft bearing mounted on a spider 16 which fits within the opening 14. The spider has a shoulder 18a.

The agitator is shown in detail in Figures 9 and 10. It consists of blades 17 secured to a disc 18. The hub of the spider receives the agitator shaft 16a on the outer end of which is mounted a driven pulley 19. The blades 17 of the agitator are preferably curved at their outer ends, the convex surfaces fronting the direction of the rotation. This agitator receives a limited or relatively slow motion of rotation such as, say, 300 revolutions per minute through the driven pulley 19 and the belt 20, driven by an electric motor 22 with a driving pulley 23. This electric motor is any commercial motor that may be desired. The agitator operates to agitate or stir the air and cause it to move amongst the eggs to supply them with the required moisture and heat.

The blades of the agitator have their faces which rotate against the air in line or parallel with the axis of its shaft. The blades are, therefore, not angular to the axis of their rotation and, therefore, do not constitute a fan in the sense of an instrumentality which would blow the air more or less in the direction of the axis. These blades of this application essentially throw the air centrifugally. One portion of the air volume moves from the agitator into the incubating chamber and the other portion moves into and through the hatcher.

A regulated quantity of the latter volume of air works through the foraminous wall 24, made up of two or more screen-like retaining layers with a fibrous or straining substance between to cause the air to sift through this wall and finally find its exit through the exhaust or outlet opening 25. Only a small, yet constant amount of air escapes, just enough to practically balance the constant fresh air inlet supply 9, which inlet supply is induced to enter the interior through the low pressure area within the opening 14. The action of the agitator induces a slightly low pressure area which, with the exit of the air through the port 25, results in an ample supply of fresh air constantly entering the apparatus.

A damper or valve device 26 is placed over the exit opening 25, and the openings 25a therein are controlled by slightly swinging the shaft 27. These parts are best seen in Figures 11, 12 and 16.

To get access to the incubating chamber 1 and to close it, resort is had to the door 28; and to get access to the hatcher chamber 2, resort is had to the door 29. The rear wall of both chambers and the bottom of the incubator chamber are protected against the effect of heat or cold by the insulating material 30, which may be of any suitable material.

I will now refer to the interior devices and their functions:

In the incubator chamber 1 are mounted a series of egg trays 31 supported by cleats 31a. In each tray are a series of egg racks 32 shown in section in Fig. 1 and in plan in Figure 5. These racks have slotted bottoms so that the air can readily enter between the eggs and bathe them with its incorporated heat and moisture. In practice these racks are tipped first to the right and then to the left, or vice-versa, so as to give the eggs the inclined positions to cause the blood from the life germ in the embryo within the shells to equally distribute itself in the contents of the shell. The hen performs this function herself and may be seen pushing the eggs in her nest to incline them first to the one side and then the other.

One means employed by me in thus tipping the racks and eggs is shown particularly in Figs. 5A and 5B. Each tray, at its rear end, is provided with a metal slide 33 adapted to be moved back and forth by any means, such, for instance, as disclosed in Patent No. 1,796,872, issued March 17, 1931. This slide has a series of prongs 34, each prong fitting in a slot 35 in each rack 32. These racks are each pivoted on a pivot 36 carried by the front and rear of the tray 31. The racks are of sheet metal bent into the required form, preferably with the bottom portions 32a curved to match the curve of the smaller end or half of an egg. The bottom of each rack is formed with a raised portion 32b to receive with the bottoms 32a, the small end of the eggs.

Each rack at each end is also provided with an open-ended slot 32c adapted to slip over the pivot pins 36. In this way the racks are individually pivotally mounted on the front and rear bars of the tray. When the slide 33 is moved either way, to the right or the left as in Fig. 5A, the racks will tip or partially rotate on the pivot pins 36, the prongs 34 moving with the slide acting to tip the racks in this manner. The dotted lines in Fig. 5A indicate two eggs mounted abreast or side by side in a rack. All the racks are alike and, therefore, each carries two eggs abreast.

I would further state that this type of rack for the eggs and this manner of tipping them on pivots carried by the trays, through the use of slides, one for each tray and its group of racks is embodied in my former Patent No. 1,796,872, dated March 17, 1931, and assigned to my present assignee, of this invention and application, and the patent to issue thereon.

The water supply pipe 38 is disposed transversely above the topmost egg tray 31 in the incubator chamber and this pipe extends through the opposite side walls 5 and 6 of the incubator, as shown in Figure 3. The water supply pipe 38 is preferably closed at one end and connected at the other to a suitable water supply and equipped with conventional valve means (not shown). The water pan 37 is pivotally mounted adjacent one end about the water supply pipe 38. The other, or free end, of the water pan 37 rests upon the cross plate 40 which is rigidly secured to the arm 39 (Figures 1, 3 and 7). The arm 39 is rigidly secured to the segment or tilting device 41. The upper end of the tilting device 41 is provided with a projection 43 having screw threads engaging the complementary threads of the adjusting screw 44. The lower edge of the tilting device 41 rests upon a ledge provided in the block 42 which is secured to the front wall 3 below, adjacent, and in alignment with the adjusting screw 44. The adjusting screw 44 is provided with a head which is especially adapted to detachably receive an adjusting key 45.

The water supply pipe 38 has a central cut-away portion disposed within the water pan 37, as shown in Figure 3. When it is desired to supply water to the water pan 37, the valve is opened to connect the pipe 38 with its water supply means. When the desired amount of water has been supplied to the pan, the valve is closed and remains closed until it is necessary to supply further water to the pan. After a predetermined amount of water is put into the pan 37, the inclination of the pan is adjusted, as desired, between the dotted line position and the full line position, shown in Figure 7 for the purpose of adjusting the area of the water surface in the pan in order to adjust the rate of evaporation.

Furthermore, due to the disposition of the hereinafter described heater 47, adjacent and above one end of the pan, and the disposition of the pipe 38, adjacent the opposite end of the pan, the raising of the free end of the pan, by adjustment of the cross plate 40, etc., increases the distance between the surface of the water and the electric heater 47.

The heating pipes 46 carry a heating fluid which by radiation heats the water in the pan. In addition, or instead, I may use a conventional electric heater 47 positioned over the adjustable portion of the pan. I may increase or decrease the evaporation surface area of the water in the pan by elevating or lowering its unpivoted end, as described above.

It may be desirable to use a guard or baffle plate 48 as shown in Fig. 1 to prevent the agitated air making too short a movement crosswise the incubating chamber at a place near the agitator 15.

Referring now to the interior appliances within the hatcher, attention is called to the partition 49 between the incubating chamber and the hatcher and to the water pan 50 in the hatcher and beneath the lower hatcher tray 51 supported by cleats 51a. This water pan is so placed to furnish moisture to the eggs now in their hottest stage, that of hatching. And farther up, the next tray, counting upward, has under it another water pan 52 supported by cleats 52a for the same purpose or reason. A layer of insulation 53 is preferably placed under this latter water pan and may be supported on cleats such as 53a (Fig. 1) for easy removal, and to prevent excessive heat reaching the pan 52.

At the rear, or right hand end of the hatcher, is placed further insulating material 30 heretofore referred to. A pivoted damper 54 with a closing spring 55 is placed between the end wall and the hatching trays for the purpose of closing the adjacent opening leading into the hatcher. An operable rod 56 connects with the damper 54 to adjust it, when the door 29 is closed, so that air from the agitator will be permitted to pass between the upper and lower racks. By preference a small strip of foraminous or other material 57 may be placed over the opening between the upper and lower trays for the purpose of preventing the chicks from passing through this space.

Finally, the electric motor 22 is supplied with a switch 22a to start and stop the motor.

In Figure 2, I have shown an enlarged view of a part of the arrangement shown in Fig. 1. The purpose of this insulating material is to more or less regulate or prevent changes of temperature in this particular part of the apparatus.

Referring to Figures 13, 14 and 15, it will be seen that they show a quantity of insulating material 24a, such as mineral wool or the like, and the foraminous wall 24 which are shown in Figure 2 in their entirety. This insulating material 24a acts to prevent germ-carrying dust particles from exhausting from the hatcher into the room where the apparatus is in operation.

Referring to Figure 8, it will be understood that it shows a vertical sectional view of that part of Figure 1 designated by the numeral 19, so as to illustrate the arrangement of the driven pulleys to the driving pulley and the arrangement of the belt, as also the shape of the housing for these parts, when two incubating and hatching units are placed close together or side by side, after the fashion of placing book shelves in sections adjoining each other. In Figure 8 the pulley A is driven by the motor, the pulley B drives one air agitator shaft and the pulley C drives another agitator shaft.

The belt 20 driven by the pulley A operates both of the driven pulleys B and C.

As illustrative of the general course of the volumes of agitated air attention is called to the arrows, first in the incubator chamber, and next those in the hatcher. Observe that the indicator arrows point downward from the peripheral ends of the agitator blades, and that these arrows bend and indicate air moving between the trays 31, and, of course, amongst the eggs in the racks 32.

Observe further the arrows are turned upward, indicating the movement of the agitated air. Then note the arrows headed from left to right opposite the central portion of the agitator. These arrows indicate the return movement of the air toward the agitator, which air moves thence into the hatcher along the course indicated by the arrows therein. A portion of these combined air volumes escapes through the exhaust opening 25, while air continuously enters through the inlet 9 and passes thence in the course shown by the arrows down to the agitator and into the interconnecting space between the incubator chamber and the hatcher chamber. Such is the line of movement of the agitated air. The very agitation of it, plus the constant income and outgo of the air give it a slow movement, like drifting clouds, carrying fresh quantities of air constantly through the machine.

From the foregoing description, in connection with the drawings, I deem the operation of this apparatus will be clearly understood, and the result produced by the apparatus will also be readily comprehended.

The invention properly divides itself into two branches, one relating to the organization or arrangement of the major elements which go to make up the apparatus, and the other to the structural features which are in themselves productive of certain results and are of convenient and efficient form.

It will be understood that I desire to comprehend within my invention such modifications as may be necessary to adapt it to the varying conditions and uses.

What I claim is new and desire to secure by Letters Patent is expressed in the following claims:

1. In an incubator-hatcher constituting substantially one structure with two separated chambers, each having egg trays and both interconnected only by an air passageway, with an air inlet common to both chambers and an air outlet in one of the chambers, the combination therewith of a rotatable air agitator so located in said interconnecting passageway as to receive air from said inlet and agitate it in two volumes, one passing through the incubator and into the hatcher and the other through the hatcher only, with portions of such air exhausting through the outlet.

2. In an incubator-hatcher, an incubator compartment and a hatcher compartment in superposed relationship, egg trays in both of them with air spaces leading to the contained eggs, and an interconnecting air space having its opening into the hatcher compartment controlled by a damper, an air inlet leading to such space and an air outlet in the hatcher compartment, all in combination with a rotatable air agitator located in said interconnecting space and adapted to agitate volumes of air from said inlet to said outlet, one volume passing through the incubator compartment and both volumes meeting in the hatcher compartment and a portion of the combined volume exhausting through said outlet.

3. In an incubator compartment, a water pan pivoted adjacent one end and adjustable to different inclinations in said compartment, and heating elements adjacent the opposite end of such pan and adapted to vaporize the water more or less according to the adjusted position of the water pan with respect to said heating elements to cause a greater or lesser evaporation surface area of water, and means to adjust said pan with respect to said heating elements to vary the water surface area and the distance of the surface from said heating elements.

4. In an incubator compartment, an adjustable water pan adapted to be placed at different inclinations therein, manual means for adjusting said pan including a screw operated movable segment having a support member upon which one end of the pan rests, and fixed heating elements over the water pan, located respectively, near the portion of the pan which has the lesser movement in adjusting the pan, and over that portion of the pan having a greater movement, so that the application of the heat to the water may be affected to control the humidity of the interior of the apparatus.

5. In an incubator, an adjustable water pan adapted to be adjusted to different inclinations in said incubator, a fixed heating element located in said incubator near such adjustable pan and adapted to more or less heat water in the pan, according to the adjustment of the surface of the water in the pan from or toward such heating element, and means to adjust said pan to different angles to vary the distance between the water surface and the fixed heating element.

6. In an incubator-hatcher including an incubating compartment and a hatching compartment each compartment having egg trays therein and air spaces amongst the egg trays, a passageway connecting said compartments and providing their sole intercommunication, and a rotatable air agitator operating in said intercommunicating passageway and adapted by centrifugal action to deliver volumes of agitated air to and amongst said egg trays both in the incubating compartment and in the hatching compartment, said agitator being so located with respect to said passageway as to deliver air from the incubating compartment to the hatching compartment but not from the hatching compartment to the incubating compartment.

7. In an incubator-hatcher, an incubating chamber and a hatching chamber superposed thereon, an air inlet passageway, motor driven mechanism operating in said air inlet passageway, a rotatable agitator driven by said motor driven mechanism and located adjacent said air inlet passageway, an air space between said incubating and hatching chambers providing the sole communication therebetween and communicating with said air inlet passageway, said agitator being adapted to supply air from said air inlet passageway to both of said chambers and from said incubating chamber upwardly to said hatching chamber while preventing entry of air from said hatching chamber to said incubating chamber, and heating and moistening devices in the path of a portion only of the agitated air.

8. In an incubator-hatcher, an incubating chamber and a superposed hatching chamber each being separated from the other and having trays to support eggs, and spaces which lead to and through the trays, and an agitator so mounted with reference to the two chambers that it puts air in agitated movement in both chambers at the same time, permitting entry of air from the incubating chamber to the hatching chamber, while preventing entry of air from the hatching chamber to the incubating chamber.

9. In an incubator-hatcher, the combination with an incubating chamber and a superimposed hatching chamber each being separated from the other and provided with egg sustaining trays, of a passageway adjacent said incubating and hatching chambers and having communication with both, and a rotatable air agitator in said pasasgeway located above said incubating chamber and below said hatching chamber whereby it functions through its centrifugal action directly to supply each chamber with a part of the air in an agitated condition, and to cause delivery of air upwardly from the incubating chamber to the hatching chamber while preventing entry of air downwardly from the hatching chamber to the incubating chamber whereby the spread of infection from the hatching chamber to the incubating chamber is prevented.

10. In an incubator-hatcher, the combination with a hatcher superposed upon an incubator in such wise as to leave an air passageway between incubator and hatcher, there being spaces about the egg trays in the incubator and the hatcher said passageway having communication with the hatcher and having therein, adjacent the hatcher, a damper controlled by the hatcher door, whereby when the hatcher is opened, the damper is closed to prevent loss of heat in the incubator, of an air inlet communicating with said air passageway, and an agitator concentric with said air inlet to agitate air in said air passageway and direct such agitated air in different directions, one to the incubator and the other to the hatcher.

11. In an incubator-hatcher including an incubating compartment and a superposed hatching compartment, each equipped with egg trays affording air spaces among the eggs, a passageway providing the sole means of communication between said compartments, and an air inlet and an outlet, and an air agitator so mounted with respect to the passageway as to be adapted to receive air entering through the inlet and to agitate it by centrifugal action and deliver a part thereof to the incubating compartment and a part thereof to he hatching compartment so that the agitated air in the incubating compartment passes thence into the hatching compartment, while air from the hatching compartment is prevented from entering the incubating compartment and thence a portion of such air exhausts through the outlet opening, said outlet opening having mounted therein an adjustable closure providing means whereby temperature in the hatching compartment may be selectively controlled, said outlet opening being disposed in the hatching compartment.

12. In an incubator-hatcher, an incubating compartment and a hatching compartment separated therefrom and disposed thereabove, an air inlet passageway leading to a point between said compartments, means to supply air from said inlet passageway to each of said compartments, said last-named means being adapted to provide for entry of air from said incubating compartment upwardly to said hatching compartment, during simultaneous operation of both, while preventing entry of air from said hatching compartment downwardly to said incubating compartment, an air outlet in said hatching compartment, and damper means between said inlet pasasgeway and said hatching compartment.

GEORGE T. MARKEY.